United States Patent [19]

Matsubara et al.

[11] Patent Number: 4,882,371

[45] Date of Patent: Nov. 21, 1989

[54] DURABLE EPOXY RESIN PAINT COMPOSITION

[75] Inventors: Yasushi Matsubara; Minoru Miyagawa; Masanori Takahashi, all of Miyagi, Japan

[73] Assignee: Tohoku Dotetsu Kabushiki Kaisha, Miyagi, Japan

[21] Appl. No.: 81,327

[22] Filed: Aug. 4, 1987

[30] Foreign Application Priority Data

Nov. 12, 1986 [JP] Japan .................. 61-267688
Nov. 12, 1986 [JP] Japan .................. 61-267689

[51] Int. Cl.$^4$ .............................................. C08K 3/20
[52] U.S. Cl. ............................... 523/406; 523/409; 523/412; 523/450; 525/121
[58] Field of Search ............ 523/406, 409, 412; 525/121, 450

[56] References Cited

U.S. PATENT DOCUMENTS 4,672,092 6/1987 Whitehouse .................. 525/121

FOREIGN PATENT DOCUMENTS 61-42578 3/1986 Japan .
62-139892 6/1987 Japan .
62-184852 8/1987 Japan .
62-238386 10/1987 Japan .
777052 6/1957 United Kingdom ............ 523/406

*Primary Examiner*—Lewis T. Jacobs
*Attorney, Agent, or Firm*—Wegner & Bretschneider

[57] ABSTRACT

A durable epoxy resin paint composition is disclosed, comprising from 0.5 to 10% of a vinylidene chloride-based resin emulsion and from 99.5 to 90% of an epoxy resin paint. A durable epoxy resin paint composition is also disclosed, comprising from 5 to 40% of a metal foil piece having a specific surface area of 1000 cm$^2$/g or more, from and from 95 to 50% of an epoxy resin paint. The durable epoxy resin paint composition of the invention not only endures salt water, gasoline, ketones, crude oil, strong acids, strong alkalis, or other chemicals for a long period of time but also is suitable for the use in foods.

5 Claims, No Drawings

DURABLE EPOXY RESIN PAINT COMPOSITION

FIELD OF THE INVENTION

The present invention relates to a durable epoxy resin paint composition.

BACKGROUND OF THE INVENTION

In order to achieve satisfactory durability, there have hitherto been proposed various paints. However, very few paints are durable to salt water, gasoline, ketones, crude oil, strong acids, strong alkalis, or other chemicals. Only an epoxy resin paint is, if anything, exemplary. Even in such an epoxy resin paint, its applied surface could not endure the use for a long period of time. Furthermore, since food paints cannot be used unless they conform to severe regulations, paints suited for the use in foods are extremely restricted.

The present applicant previously filed applications for patent titled with "STAINLESS STEEL-CONTAINING EPOXY RESIN PAINT" (Japanese Patent Application No. 162872/84, Japanese Patent Laid-open No. 42578/86); "CONCRETE COATING METHOD" (Japanese Patent Application No. 115414/85); "ELECTRODE GRID" (Japanese Patent Application No. 277937/85); "METHOD FOR FORMING CHEMICAL-RESISTANT FILMS" (Japanese Patent Application No. 25974/86); "ELECTRODE GRID" (Japanese Patent application No. 79242/86); and "METHOD FOR FORMING ACID-RESISTANT FILMS" (Japanese Patent Application No. 114683/86). The present invention is one related to those in the foregoing applications for patent.

As described above, since there has hitherto been available no epoxy resin paint that can endure salt water, gasoline, ketones, crude oil, strong acids, strong alkalis, or other chemicals for a long period of time, realization of a more durable paint is being demanded.

SUMMARY OF THE INVENTION

The present invention has been made in order to realize a durable epoxy resin paint composition that not only endures salt water, gasoline, ketones, crude oil, strong acids, strong alkalis, or other chemicals for a long period of time but also is suitable for the use in foods.

That is, an object of the present invention is to provide a durable epoxy resin paint composition comprising a vinylidene chloride-based resin emulsion and an epoxy resin paint.

DETAILED DESCRIPTION OF THE INVENTION

In one embodiment (hereinafter referred to as "the first embodiment"), the present invention relates to a durable epoxy resin paint composition comprising from 0.5 to 10% of a vinylidene chloride-based resin emulsion and from 99.5 to 90% of an epoxy resin paint.

In another embodiment (hereinafter referred to as "the second embodiment"), the present invention relates to a durable epoxy resin paint composition comprising from 5 to 40% of a metal foil piece having a specific surface area of 1000 cm$^2$/g or more, from 0.5 to 10% of a vinylidene chloride-based resin emulsion, and from 95 to 90% of an epoxy resin paint.

The durable epoxy resin paint composition according to the present invention contains from 0.5 to 10% of a vinylidene chloride-based resin emulsion. Examples of the vinylidene chloride-based resin emulsion which can be used include Saran Latex R Type L 321 (a trademark of Asahi Chemical Industry Co., Ltd.). Saran Latex R is produced by Asahi Chemical Industry, Co. Ltd. It is a synthetic resin liquid which is opal in color (composed of 1,000–1,500 Å fine particulates and water) having vinylidene chloride as the main component. It is readily dilutable in soft water and forms a transparent coating film. Saran Latex R Type L321 has the following properties:

| | |
|---|---|
| pH | 2–6 |
| surface tension (dyne/cm) | 30–40 |
| resin content (solid %) | 43–47 |
| relative weight (20° C.) | 1.13–1.21 |
| viscosity (C.P.S.) | 3–9 |
| diameter of particulates (Å) | 900–1800. |

The vinylidene chloride-based resin emulsion is mixed with an epoxy resin paint which is free from a curing agent. If the amount of the vinylidene chloride-based resin emulsion to be added exceeds 10%, the affinity between the vinylidene chloride-based resin emulsion and the epoxy resin paint becomes poor, whereby the desired effects cannot be attained. If the amount is less than 0.5%, the effect of improving the durability is not satisfactory. A most optimum amount of the vinylidene chloride-based resin emulsion to be added is about 3%. As a solvent of the epoxy resin paint containing the vinylidene chloride-based resin emulsion, ethylene glycol monomethyl ether is preferably used. In the second embodiment of the present invention, the above-described epoxy resin paint which is free from a curing agent may be previously incorporated with metal foil.

The epoxy resin paint which can be used in the present invention may be a modified epoxy resin paint such as tar-epoxy resin paint containing from 5 to 30% of tar. A suitable amount of the epoxy resin paint which can be used is from 99.5 to 90% in the first embodiment and from 95 to 50% in the second embodiment, respectively.

In the second embodiment of the present invention, the durable epoxy resin paint composition contains from 5 to 40% of metal foil having a specific surface area of 1000 cm$^2$/g or more. Examples of the metal foil which can be used include a stainless steel foil and a cupro-nickel foil. Specific examples of the stainless steel include SUS 316L and SUS 304, and specific examples of the cupro-nickel include one having a formulation composed of from 90 to 70% of copper and from 10 to 30% of nickel. The shape of the foil used is, for example, oval or leaf-like having a thickness of not more than 3 μm, a width of not more than 100 μm, and a length of not more than 100 μm. Those having a specific surface area of 1000 cm$^2$/g or more give rise to good results. If the specific surface area is less than 1000 cm$^2$/g, the foil is merely present in a vehicle of the paint composition, whereby it does not contribute to a sufficient improvement in durability of the film. If the specific surface area is 1000 cm$^2$/g or more, the foil is present in the stratum-form state in a vehicle of the paint composition, whereby it contributes to a sufficient improvement in durability of the film.

In the film obtained from the durable epoxy resin paint composition according to the present invention, the observation by an electron microscope or by irradiation with infrared rays confirms that no particles of the vinylidene chloride-based resin are present. Thus, it may be considered that the epoxy resin and the vinylidene chloride-based resin either react with each other or are strongly bonded to each other.

In using the durable epoxy resin paint composition according to the present invention, a curing agent of the epoxy resin paint is added, followed by application in the customary manner. In the case in which the mixture is diluted, ethylene glycol monomethyl ether is suitable as a solvent.

The following Examples are provided for the purpose of further illustrating the present invention but in no sense to be taken as limiting.

EXAMPLE 1

As a durable epoxy resin paint composition according to the present invention, a paint composition consisting of 3% of a vinylidene chloride-based resin emulsion and 97% of an epoxy resin paint was used. A test water was prepared by the dissolution test method according to the tar-epoxy resin paint application method for JWWA K-115 tap water. The water used herein was tap water.

The results are shown in Table 1. It is clear from the showings of Table 1 that the durable epoxy resin paint composition according to the present invention can meet the water conditioning requirements as stipulated in the City Water Law (see Ordinance No. 56 of the Health and Welfare Office, 1978) and is suitable for the use in foods.

TABLE 1

| Examination Item | Test Water | Blank (Tap Water) | Standard Value |
|---|---|---|---|
| Nitric nitrogen and nitrous nitrogen | 0.9 mg/l | 0.9 mg/l | ≦10 mg/l |
| Chlorine ion | 22.7 mg/l | 22.7 mg/l | ≦200 mg/l |
| Amount of Potassium permanganate consumed | 1.6 mg/l | 0.9 mg/l | ≦10 mg/l |
| General bacteria | ≦100/ml | ≦100/ml | ≦100/ml |
| Golon bacilli group | not detected | not detected | to be not detected |
| Cyan ion | not detected | not detected | to be not detected (≦0.01 mg/l) |
| Mercury | not detected | not detected | to be not detected (≦0.0005 mg/l) |
| Organophosphorus | not detected | not detected | to be not detected (≦0.1 mg/l) |
| Copper | ≦0.01 mg/l | ≦0.01 mg/l | ≦1.0 mg/l |
| Iron | ≦0.05 mg/l | ≦0.05 mg/l | ≦0.3 mg/l |
| Manganese | ≦0.01 mg/l | ≦0.01 mg/l | ≦0.3 mg/l |
| Zinc | 0.02 mg/l | 0.01 mg/l | ≦1.0 mg/l |
| Lead | ≦0.01 mg/l | ≦0.01 mg/l | ≦0.1 mg/l |
| Hexavalent chromium | ≦0.02 mg/l | ≦0.02 mg/l | ≦0.05 mg/l |
| Cadmium | ≦0.005 mg/l | ≦0.005 mg/l | ≦0.01 mg/l |
| Arsenic | ≦0.0005 mg/l | ≦0.005 mg/l | ≦0.05 mg/l |
| Fluorine | ≦0.15 mg/l | ≦0.15 mg/l | ≦0.8 mg/l |
| Hardness | 61 mg/l | 61 mg/l | ≦300 mg/l |
| Evaporation residue | 144 mg/l | 141 mg/l | ≦500 mg/l |
| Phenols | ≦0.005 mg/l | ≦0.005 mg/l | ≦0.005 mg/l as phenol |
| Anionic surfactant | ≦0.2 mg/l | ≦0.2 mg/l | ≦0.5 mg/l |
| pH value | pH 7.1 | pH 7.1 | 5.8–8.6 |
| Residual chlorine | — | — | — |
| Odor | normal | normal | to be not abnormal |
| Taste | normal | normal | to be not abnormal |
| Chromaticity | 1° | 1° | ≦5° |
| Turbidity | 1° | 1° | ≦2° |

EXAMPLE 2

As a substrate, an iron plate of black skin that is a hot coil-made or calendered steel plate is used. After degreasing the surface of the iron plate, a stainless steel-containing epoxy resin paint is applied thereonto to form an undercoat portion. On the undercoat portion, a durable epoxy resin paint composition according to the present invention, which consists of 3% of a vinylidene chloride-based resin emulsion and 97% of an epoxy resin paint is applied.

The thus formed applied surface was subjected to cross-cut test. As a result, it was found to be good as 100/100. Further, when the applied surface was boiled in tap water for one hour, though the surface was slightly colored white, it was found not abnormal. Still further, when the cross-cut test was carried out after boiling, the resulting surface was found to be good as 50/100.

In addition, when the assembly was immersed with methyl ethyl ketone (purity: 99% or more) for 25 days or longer, it was found not abnormal. The same was also observed when immersed with gasoline for 60 days or longer and with crude oil for 6 months or longer, respectively.

EXAMPLE 3

On the circumference of an aluminum-made electrode grid, a commercially available epoxy resin paint is first applied in the customary manner to provide an undercoat, and a durable epoxy resin paint composition according to the present invention, which consists of 3% of a vinylidene chloride-based emulsion and 97% of an epoxy resin paint, is then applied onto the undercoat. Although there may be a case in which one application thereof is sufficient, the durability is improved as the repeated applications are performed. Further, though the epoxy resin paint may contain a pigment or other additives, a clear one is preferred, if possible.

In the case in which the paint composition is used for an electrode grid, the composition becomes durable to even electrolyte liquors of high temperature as the amount of the vinylidene chloride-based resin emulsion to be added is increased. For example, if the amount is 3%, the paint composition can endure a temperature of about 50° C., but the durability of the paint composition to a temperature of about 70° C. is not sufficient unless the amount is adjusted to from 6 to 8%. If the amount exceeds 10%, the affinity between vinylidene chloride-based resin emulsion and epoxy resin paint is poor, and if it is less than 0.5%, the effect which can be brought by the addition of vinylidene chloride-based resin emulsion is not sufficiently attained. It may be considered that the vinylidene chloride-based resin emulsion is effective for preventing damages by acids and improving the expansion durability by the action of the temperature. By the addition of the vinylidene chloride-based resin emulsion, the amount of expansion of the electrode grid by the action of the temperature becomes approximately equal to that of the applied portion by the action of the temperature, whereby the adhesion can be kept without causing peeling off.

Using an aluminum-made electrode grid prepared by one application of an undercoat on the circumference of an electrode grid and five applications of overcoats (film thickness: 600 μm) as described above, refining of zinc was carried out under the conditions that the sulfuric acid concentration is 15% and the electrolyte liquor temperature is at result, good results were obtained that the life time is longer as compared with the case which a conventional polyvinyl chloride sheet was adhered.

EXAMPLE 4

On the circumference of an aluminum-made electrode grid, a tar-epoxy resin paint (containing about 25% of tar) is first applied to provide an undercoat.

A durable epoxy resin paint composition according to the present invention, which consists of 3% of a vinylidene chloride-based resin emulsion and 97% of a tar-epoxy resin paint, is then applied onto the undercoat.

Using an aluminum-made electrode grid prepared by one application of an undercoat on the circumference of an electrode grid and five applications of overcoats (film thickness: 600 μm), refining of zinc was carried out under the conditions that the sulfuric acid concentration is 15% and the electrolyte liquor temperature is at about 45° C. with an electric current of 20 kA. As a result, good results were obtained that the life time is longer as compared with the case in which a conventional polyvinyl chloride sheet was adhered.

EXAMPLE 5

Each of iron plate, copper plate, and aluminum plate is degreased and dressed, and a tar-epoxy resin paint (containing about 10% of tar) is applied thereonto to provide an undercoat. The tar-epoxy resin paint used herein is a mixture of approximately equal amounts of a commercially available tar-epoxy resin painting (containing about 25% of tar) and a commercially available epoxy resin paint. The application procedure of the tar-epoxy resin paint for the use is carried out after adding thereto a curing agent in the customary manner.

On the undercoat surface, a durable epoxy resin paint composition according to the present invention, which consists of 3% of a vinylidene chloride-based resin emulsion and 97% of an epoxy resin paint is applied. The application procedure thereof for the use is carried out after adding thereto a curing agent in the customary manner.

As described above, a test specimen was prepared by one application of an undercoat and one application of an overcoat, respectively. The test specimen was immersed with a boiled 12% hydrochloric acid and, with the lapse of a predetermined period of time, was evaluated with respect to properties of the film, such as occurrence of peeling. Further, the film was evaluated with respect to hardness by cutting by means of a cutter knife and to adhesion by the cross-cut test.

Iron Plate:

The film of the test specimen was durable to the immersion for 150 minutes and tough in terms of hardness. Further, the results of the cross-cut test showed that it was extremely good in adhesion as 100/100.

Copper Plate:

The film of the test specimen was durable to the immersion for 180 minutes and tough in terms of hardness. Further, the results of the cross-cut test showed that it was extremely good in adhesion as 100/100. In the case in which a tar-epoxy resin paint (containing about 25% of tar) was used as undercoat, the resulting film was also durable to the immersion for 180 minutes and tough in terms of hardness. Further, the results of the cross-cut test showed that it was extremely good in adhesion as 100/100.

Aluminum Plate:

The film of the test specimen was durable to the immersion for 180 minutes and tough in terms of hardness. Further, the results of the cross-cut test showed that it was extremely good in adhesion as 100/100.

EXAMPLE 6

A durable epoxy resin paint composition according to the present invention, consisting of 3% of a vinylidene chloride-based resin emulsion and 97% of an epoxy resin paint, was used.

The test under the conditions that the sodium hydroxide concentration is 20% and the temperature is 50° C. confirmed that no change occurred for 40 days. Further, as a result of the test under the conditions that the sulfuric acid concentration is 20% and the temperature is 50° C., the occurrence of partial blister was observed after 40 days. These results revealed that the paint composition of the present invention was superior to the conventional paint's in property.

EXAMPLE 7

A soft steel plate having a width of 70 mm and a length of 150 mm was conditioned with a ketone and applied with, as an undercoat, a commercially available epoxy zinc-rich paint and further with a durable epoxy resin paint composition according to the present invention to prepare a test specimen. The test specimen was tested by spraying salt water having a concentration of 5% for 500 hours. The film thickness was measured by a micrometer, and its average value was taken. A primary adhesion test value is a value measured by an adhesion tester before the test, and a secondary adhesion test value is a value measured by an adhesion tester after the spraying test for 500 hours. For the durable epoxy resin paint composition according to the present invention, a composition consisting of 15% of a metal foil, 3% of a vinylidene chloride-based resin emulsion, and 82% of an epoxy resin paint was used.

In the case in which metal foil having a specific surface area of 3800 $cm^2/g$ made of stainless steel SUS 304 was used, the applied surface was found good having a film of thickness of 160 μm, a primary adhesion test value of 28 $kg/cm^2$, and a secondary adhesion test value of 1 $kg/cm^2$.

In the case in which metal foil having a specific surface area of 5750 $cm^2/g$ made of stainless steel SUS 304 was used, the applied surface was found good having a film of thickness of 160 μm, a primary adhesion test value of 25 $kg/cm^2$, and a secondary adhesion test value of from 1 to 2 $kg/cm^2$.

In the case in which metal foil having a specific surface area of from 3000 to 5000 $cm^2/g$ made of stainless steel SUS 316L was used, the applied surface was found good having a film of thickness of 180 μm, a primary adhesion test value of 28 $kg/cm^2$, and a secondary adhesion test value of from 1 to 4 $kg/cm^2$.

In the case in which metal foil having a specific surface area of 3140 $cm^2/g$ made of cupro-nickel was used, the applied surface was found good having a film of thickness of 130 μm, a primary adhesion test value of 30 kg/cm$^2$, and a secondary adhesion test value of 3 kg/cm$^2$.

In the case in which metal foil having a specific surface area of 9250 cm$^2$/g made of cupro-nickel was used, the applied surface was found good having a film of thickness of 130 μm, a primary adhesion test value of 20 kg/cm$^2$, and a secondary adhesion test value of from 7 to 13 kg/cm$^2$.

On the other hand, in the case in which a paint composition prepared by adding metal foil of stainless steel SUS 316L, having a specific surface area of from 3000 to 3500 cm$^2$/g to an epoxy resin paint without adding a vinylidene chloride-based resin emulsion was used, a film having a thickness of 180 μm, a primary adhesion test value of 28 kg/cm$^2$, and a secondary adhesion test value of from 1 to 4 kg/cm$^2$ was obtained. This film was observed to have been generated a number of blisters thereon and was inferior in quality to the foregoing films according to the present invention.

EXAMPLE 8

As a substrate, a hot coil-made iron plate of black skin or of calendered steel plate is used. After degreasing the surface of the iron plate, a stainless steel-containing epoxy resin paint is applied thereon to form an undercoat portion. On the undercoat portion, a durable epoxy resin paint composition according to the present invention containing 3% of a vinylidene chloride-based resin emulsion and 15% of stainless steel metal foil is applied.

The thus formed applied surface was subjected to a cross-cut test. As a result, it was found to be good as 100/100. Further, when the applied surface was boiled in tap water for one hour, it was not substantially abnormal. Still further, when the cross-cut test was carried out after boiling, the resulting surface was found to be good as 50/100.

In addition, when the assembly was immersed with methyl ethyl ketone (purity: 99% or more) for 25 days or longer, it was not found to be abnormal. The same was also observed when immersed with gasoline for 60 days or longer and with crude oil for 6 months or longer, respectively.

EXAMPLE 9

A durable epoxy resin paint of the present invention, containing 3% of a vinylidene chloride-based resin emulsion and 15% of a stainless steel metal foil was used. A test water was prepared in dissolution test method according to the tar-epoxy resin paint application method for JWWA K-115 tap water. The water used herein was tap water.

The results are shown in Table 2. It is clear from the showings of Table 2 that the durable epoxy resin paint composition according to the present invention can meet the water conditioning requirements as stipulated in the City Water Law (see Ordinance No. 56 of the Health and Welfare Office, 1978) and is suitable for the use in foods.

TABLE 2

| Examination Item | Test Water | Blank (Tap Water) | Standard Value |
|---|---|---|---|
| Nitric nitrogen and nitrous nitrogen | 0.9 mg/l | 0.9 mg/l | ≦10 mg/l |
| Chlorine ion | 22.7 mg/l | 22.7 mg/l | ≦200 mg/l |
| Amount of Potassium permanganate | 1.6 mg/l | 0.9 mg/l | ≦10 mg/l |

TABLE 2-continued

| Examination Item | Test Water | Blank (Tap Water) | Standard Value |
|---|---|---|---|
| consumed | | | |
| General bacteria | ≦100/ml | ≦100/ml | ≦100/ml |
| Golon bacilli group | not detected | not detected | to be not detected |
| Cyan ion | not detected | not detected | to be not detected (≦0.01 mg/l) |
| Mercury | not detected | not detected | to be not detected (≦0.0005 mg/l) |
| Organophosphorus | not detected | not detected | to be not detected (≦0.1 mg/l) |
| Copper | ≦0.01 mg/l | ≦0.01 mg/l | ≦1.0 mg/l |
| Iron | ≦0.05 mg/l | ≦0.05 mg/l | ≦0.3 mg/l |
| Manganese | ≦0.01 mg/l | ≦0.01 mg/l | ≦0.3 mg/l |
| Zinc | 0.02 mg/l | 0.01 mg/l | ≦1.0 mg/l |
| Lead | ≦0.01 mg/l | ≦0.01 mg/l | ≦0.1 mg/l |
| Hexavalent chromium | ≦0.02 mg/l | ≦0.02 mg/l | ≦0.05 mg/l |
| Cadmium | ≦0.005 mg/l | ≦0.005 mg/l | ≦0.01 mg/l |
| Arsenic | ≦0.0005 mg/l | ≦0.005 mg/l | ≦0.05 mg/l |
| Fluorine | ≦0.15 mg/l | ≦0.15 mg/l | ≦0.8 mg/l |
| Hardness | 63 mg/l | 61 mg/l | ≦300 mg/l |
| Evaporation residue | 143 mg/l | 141 mg/l | ≦500 mg/l |
| Phenols | ≦0.005 mg/l | ≦0.005 mg/l | ≦0.005 mg/l as phenol |
| Anionic surfactant | ≦0.2 mg/l | ≦0.2 mg/l | ≦0.5 mg/l |
| pH value | pH 7.1 | pH 7.1 | 5.8–8.6 |
| Residual chlorine | — | — | — |
| Odor | normal | normal | to be not abnormal |
| Taste | normal | normal | to be not abnormal |
| Chromaticity | 1° | 1° | ≦5° |
| Turbidity | 1° | 1° | ≦2° |

EXAMPLE 10

A durable epoxy resin paint composition according to the present invention, containing 3% of a vinylidene chloride-based resin emulsion and 15% of a stainless steel metal foil, was used.

The test under the conditions that the sodium hydroxide concentration is 20% and the temperature is at 50° C. confirmed that no change occurred for 40 days. Further, as the result of the test under the conditions that the sulfuric acid concentration is 20% and the temperature is at 50° C., the occurrence of partial blister was observed after 40 days. These results reveal that the paint composition of the present invention is superior to the conventional paints.

EXAMPLE 11

On a degreased and dressed copper plate, a durable epoxy resin paint composition according to the present invention, containing 3% of a vinylidene chloride-based resin emulsion, 15% of stainless steel metal foil, and about 82% of tar-epoxy resin paint containing about 25% of tar, was applied twice by a brush to prepare a test specimen.

The thus formed applied surface was subjected to a cross-cut test. As a result, it was found to be good as 100/100. Further, when the applied surface was boiled in tap water for one hour, though the surface was slightly faded in color, the film did not change. Still further, when the cross-cut test was carried out after boiling, the resulting surface was found to be good as 100/100.

In addition, when the assembly was immersed with methyl ethyl ketone (purity: 99% or more) for 25 days or longer, it was not found to be abnormal. The same was also observed when immersed with gasoline for 60 days or longer and with crude oil for 6 months or longer, respectively.

It is evident from the foregoing results that the durable epoxy resin paint composition according to the present invention has the following effects:

(1) It can meet the water conditioning requirements as stipulated in the City Water Law (see Ordinance No. 56 of the Health and Welfare Office, 1978) and is suitable for the use in foods;

(2) It provides an applied surface that endures salt water, gasoline, ketones, or crude oil for a long period of time;

(3) It provides a substrate surface such as iron, copper, aluminum, or stainless steel with an applied surface that endures strong acids such as sulfuric acid or hydrochloric acid, strong alkalis such as sodium hydroxide, or other chemicals for a long period of time; and (4) When applied onto an electrode grid, it has a long life time and provides good results as compared with the case in which a conventional polyvinyl chloride sheet is applied.

While the invention has been described in detail and with reference to the specific inventions embodiments thereof, it will be apparent to one skilled in the art that various changes and modifications can be made therein without departing from the spirit and scope thereof.

What is claimed is:

1. A durable epoxy resin paint composition comprising from 0.5 to 10% of a vinylidene chloride-based resin emulsion and from 99.5 to 90% of an epoxy resin paint.

2. A durable epoxy resin paint composition as claimed in claim 1, wherein said epoxy resin paint is a tar-epoxy resin paint.

3. A durable epoxy resin paint composition comprising from 5 to 40% of metal foil having a specific surface area of 1000 cm$^2$/g or more, from 0.5 to 10% of a vinylidene chloride-based resin emulsion, and from 95 to 50% of an epoxy resin paint.

4. A durable epoxy resin paint composition as claimed in claim 3, wherein said metal foil is stainless steel foil or cupro-nickel foil.

5. A durable epoxy resin paint composition as claimed in claim 3, wherein said epoxy resin paint is a tar-epoxy resin paint.

* * * * *